US011860792B2

(12) United States Patent
Tsirkin

(10) Patent No.: US 11,860,792 B2
(45) Date of Patent: Jan. 2, 2024

(54) MEMORY ACCESS HANDLING FOR PERIPHERAL COMPONENT INTERCONNECT DEVICES

(71) Applicant: RED HAT, INC., Raleigh, NC (US)

(72) Inventor: Michael Tsirkin, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/307,274

(22) Filed: May 4, 2021

(65) Prior Publication Data

US 2022/0358049 A1 Nov. 10, 2022

(51) Int. Cl.

| | |
|---|---|
| ***G06F 12/109*** | (2016.01) |
| ***G06F 12/02*** | (2006.01) |
| ***G06F 12/14*** | (2006.01) |
| ***G06F 9/48*** | (2006.01) |
| ***G06F 13/42*** | (2006.01) |
| ***G06F 9/455*** | (2018.01) |

(52) U.S. Cl.

CPC ........ *G06F 12/109* (2013.01); *G06F 9/45558* (2013.01); *G06F 9/4812* (2013.01); *G06F 12/0238* (2013.01); *G06F 12/1441* (2013.01); *G06F 13/4221* (2013.01); *G06F 2009/45583* (2013.01)

(58) Field of Classification Search

CPC ..................................................... G06F 12/109

USPC .......................................................... 711/154

See application file for complete search history.

(56) References Cited

U.S. PATENT DOCUMENTS

| | | | | |
|---|---|---|---|---|
| 6,241,400 | B1 * | 6/2001 | Melo | G06F 13/423 710/313 |
| 7,653,803 | B2 | 1/2010 | Hummel et al. | |
| 8,892,802 | B2 | 11/2014 | Amit et al. | |
| 9,535,849 | B2 | 1/2017 | Kegel et al. | |
| 10,489,302 | B1 | 11/2019 | Habusha et al. | |
| 2007/0038839 | A1 * | 2/2007 | Hummel | G06F 12/1027 711/E12.067 |
| 2007/0168636 | A1 * | 7/2007 | Hummel | G06F 13/404 711/E12.067 |

(Continued)

FOREIGN PATENT DOCUMENTS

| | | |
|---|---|---|
| KR | 101950000 B1 | 2/2019 |

OTHER PUBLICATIONS

Amit, Nadav et al., "Bare-Metal Performance for Virtual Machines with Exitless Interrupts", ACM Magazine Jan. 2016, vol. 59, No. 1, available at https://cacm.acm.org/magazines/2016/1/195734-bare-metal-performance-for-virtual-machines-with-exitless-interrupts/fulltext, p. 12.

(Continued)

*Primary Examiner* — Titus Wong

(74) *Attorney, Agent, or Firm* — Lowenstein Sandler LLP

(57) ABSTRACT

Systems and methods for memory management for virtual machines. An example method may include receiving, by a host computing system, a memory access request initiated by a peripheral component interconnect (PCI) device, wherein the memory access request comprises a memory address and an address translation flag specifying an address space associated with the memory address; and responsive to determining that the address translation flag is set to a first value indicating a host address space, causing a host system input/output memory management unit (IOMMU) to pass-through the memory access request.

11 Claims, 6 Drawing Sheets

(56) References Cited

U.S. PATENT DOCUMENTS

2007/0168643 A1* 7/2007 Hummel ............. G06F 12/1081
711/E12.067
2010/0011147 A1* 1/2010 Hummel ............. G06F 9/45558
718/1
2010/0122062 A1* 5/2010 Hummel ............. G06F 12/1081
711/204
2012/0284437 A1* 11/2012 Ayzenfeld ............. G06F 13/387
710/104
2013/0067194 A1* 3/2013 Craddock ........... G06F 12/0292
711/206
2013/0080726 A1* 3/2013 Kegel ..................... G06F 21/85
711/163
2014/0189690 A1* 7/2014 Ramakrishnan Nair ....................
G06F 9/461
718/1
2015/0089150 A1* 3/2015 Kessler ............... G06F 12/0888
711/139
2015/0127871 A1* 5/2015 Desai ...................... G06F 13/28
710/308

OTHER PUBLICATIONS

Xu, Cong et al., "vTurbo: Accelerating Virtual Machine I/A Processing Using Designated Turbo Sliced Core", Department of Computer Science, Purdue University, USENIX, 2013 USENIX Annual Technical Conference (USENIX ATC '13) available at https://friends.cs.purdue.edu/pubs/ATC13.pdf, pp. 243-254.

* cited by examiner

MEMORY ACCESS HANDLING FOR PERIPHERAL COMPONENT INTERCONNECT DEVICES

TECHNICAL FIELD

The present disclosure is generally related to virtualized computer systems, and more particularly, to improving memory access handling for peripheral component interconnect devices.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
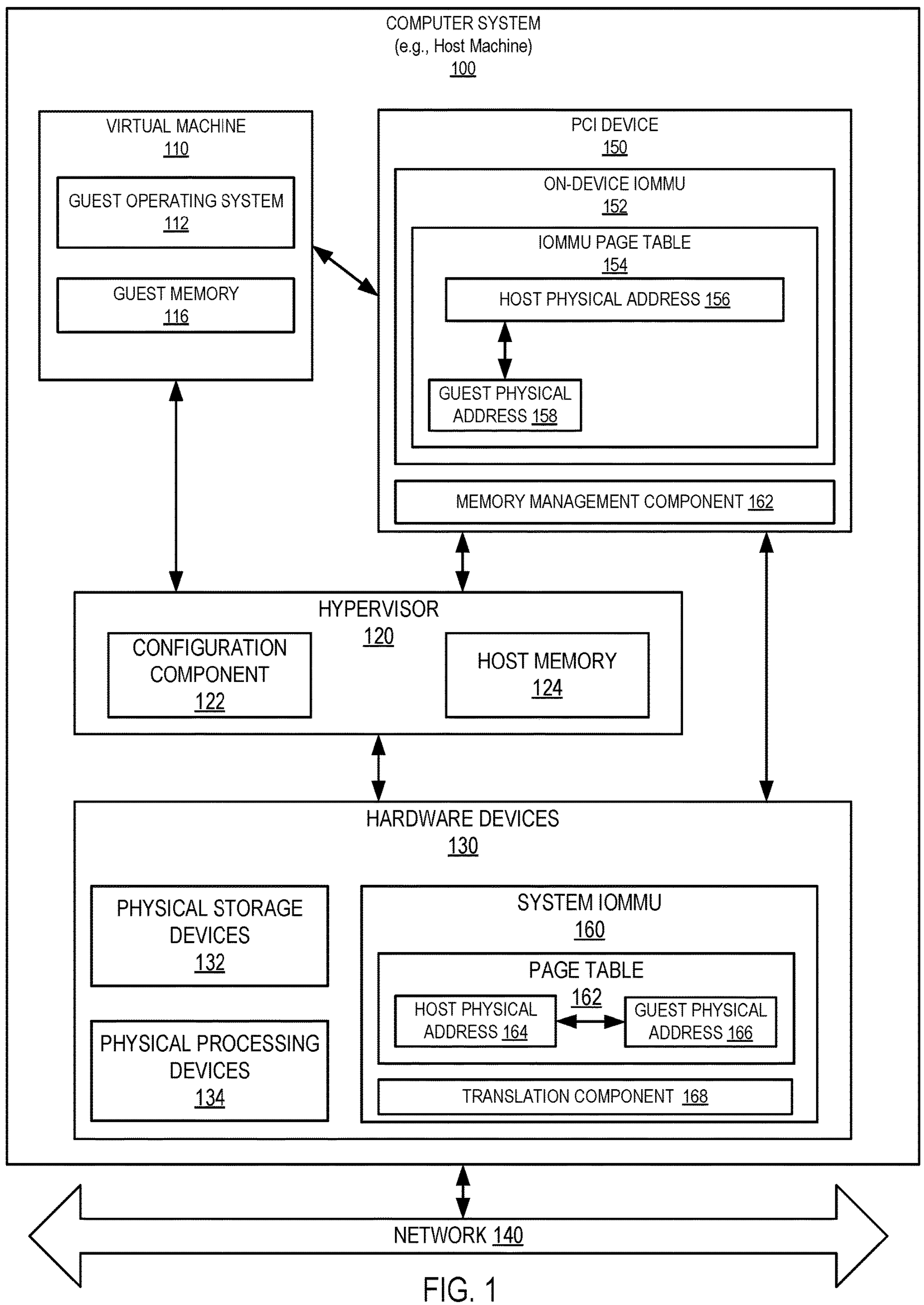
FIG. 1 depicts a high-level block diagram of an example host computer system that performs memory management for PCI devices, in accordance with one or more aspects of the present disclosure.

Described herein are systems and methods for improving memory access handling for peripheral component interconnect (PCI) devices.

A PCI device is an external computer hardware device that connects to a computer system. In some instances, the PCI device may be coupled to a physical bus of the host machine. In some instances, the hypervisor may abstract the PCI device by assigning particular port ranges of the PCI device to the virtual machine and presenting the assigned port ranges to the virtual machine as the virtual device. The PCI device may be capable of direct memory access (DMA). DMA allows the PCI device to access the system memory for reading and/or writing independently of the central processing unit (CPU). PCI devices that are capable of performing DMA include disk drive controllers, graphics cards, network interface cards (NICs), sound cards, or any other input/output (I/O) device. While the hardware device is performing the DMA, the CPU can engage in other operations.

A PCI device having DMA-capable devices often uses an input/output memory management unit (IOMMU) to manage address translations. An IOMMU is a hardware memory management unit (MMU) that resides on the input/output (I/O) path connecting the device to the memory. The IOMMU may map the device address space (e.g., a bus address) that is relevant to the I/O bus into the physical address space (e.g., host physical address) that is relevant to the memory bus. The IOMMU may include an IOMMU page table, which includes a set of page table entries, such that each page table entry translates a guest physical address of a guest memory pages to a host physical address of the host memory. The IOMMU may also include extra information associated with the address space mapping such as read and write permissions.

During the runtime of a virtual machine, the hypervisor can intercept I/O communications (e.g., memory access requests, interrupt requests, etc.) from the PCI device and handle each I/O communication by forwarding the communication to an appropriate physical device at the host machine (e.g., the underlying I/O device, a memory device at the host machine, etc.). In one example, the hypervisor may intercept a guest memory access request from the PCI device, forward it to a host system IOMMU for translation (e.g., guest memory address(es) to host memory address(es)), and provide host memory access using the translated memory access request. In another example, the hypervisor may intercept an interrupt request from the PCI device, translate the interrupt request via the host system IOMMU, and provide the event associated with the interrupt request to the virtual machine.

In current systems, PCI devices in communication with the system IOMMU have drawbacks, such as a bottleneck caused by the system looking up address translations, for memory access requests, in the IOMMU translation table. As a solution, some PCI devices use an on-device IOMMU. The on-device IOMMU may poll (using a poll operation) the host system to check the status of the virtual machine (whether new data is available), translate memory access to guest memory, and initiate memory accesses directly to the host memory. The PCI device may then retrieves memory page(s) from the host memory and stores the memory page(s) in the on-device IOMMU's cache. During these operations performed by the PCI device, the system IOMMU may be set to pass-through mode. In pass-through mode, the PCI device may access the host memory without the hypervisor trapping the PCI device's communication (e.g., memory access request) for translation by the system IOMMU.

However, while in pass-through mode, an interrupt request from the PCI device will result in the virtual machine temporarily exiting to the hypervisor (e.g., by a VMExit event) and being subsequently restarted (e.g., by a VMEnter instruction). This process causes the VM to pause its processing threads, uses additional processing resources (e.g., central processing unit (CPU) resources), and hinders performance of the virtual machine. On the other hand, interrupt requests from the PCI device have low bandwidth (as compared to memory access requests) and may be translated without causing a performance bottleneck.

In current system, the IOMMU can either translate memory access requests and interrupt requests from a PCI device or be set to pass-through mode. However, as discussed above, memory access requests from a PCI device are more efficiency processed by the on-device IOMMU, while interrupt requests may be processed by the host system IOMMU without causing a performance bottleneck. Thus, systems and methods capable of selectively enabling and disabling pass-through mode by the host system IOMMU are desirable.

Aspects of the present disclosure address the above-noted and other deficiencies by providing technology that improves memory request handling for PCI devices. In particular, aspects of the present disclosure enable a host system to cause the host system IOMMU to enter pass-through mode in response to receiving translated memory access requests from the PCI device. Aspects of the present disclosure further enable the host system to cause the host system IOMMU to process interrupt requests from the PCI device.

In an embodiment, a hypervisor may first enable the host system IOMMU to receive translated memory access requests. A translated memory access request may allow the PCI device to directly access the host memory. The hypervisor may then enable the PCI device to access virtual device memory using host physical addresses. The PCI device may, thus, request address translations (guest physical memory to host physical memory) from the host system IOMMU. The PCI device may then receive the address translations from the host system IOMMU and store the address translations in the on-device IOMMU page table. The on-device IOMMU page table may include a set of page table entries where each page table entry translates a guest physical address of guest memory page(s) to a host physical address of the host memory. The PCI device may use the on-device IOMMU to translate the guest memory address of memory access requests initiated by the PCI device. For example, in response to the PCI device issuing a memory access request for guest memory, the PCI device may translate the memory access request using the address translations stored in the on-device IOMMU page table. The PCI device may further set an address translation flag for each memory access request that is translated by the on-device IOMMU. The address translation flag may specify a host address space associated with the memory address of the memory access request.

The host system IOMMU may pass-through (translated) memory access requests to the host memory with an enabled address translation flag (e.g., a translated-request bit set to a value of 1). Thus, in response to receiving a memory access request from the PCI device, the system IOMMU may determine that the memory access request includes an enabled address translation flag, and allow direct access to the host memory without first translating the memory access request. As such, the memory access request bypasses translation by the system IOMMU, thus preventing a performance bottleneck.

The PCI device may communicate interrupt requests to the host system IOMMU. Interrupt requests may not include an address translation flag, or may include a disabled address translation flag (set to a value of 0). As such, the host system IOMMU may translate the interrupt requests and send the translated interrupt request to the virtual central processing unit (vCPU) of the virtual machine. Accordingly, the interrupt request is not handled by the hypervisor, and, thus, the virtual machine does not need to temporarily exit to the hypervisor (e.g., by a VMExit event) and be subsequently restarted (e.g., by a VMEnter instruction). This may prevent performance issues associated with VM exits.

Various aspects of the above referenced methods and systems are described in details herein below by way of examples, rather than by way of limitation. The examples provided below discuss a virtualized computer system where hardware and software configuration and memory movement may be initiated by aspects of a hypervisor, a host operating system, a virtual machine, a PCI device, or a combination thereof. In other examples, the ware and software configuration and memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 120, hardware devices 130, a network 140, and a Peripheral Component Interconnect (PCI) device 150.

Virtual machine 110 may execute guest executable code that uses an underlying emulation of the physical resources. The guest executable code may include a guest operating system, guest applications, guest device drivers, etc. Virtual machines 110 may support hardware emulation, full virtualization, para-virtualization, operating system-level virtualization, or a combination thereof. Virtual machine 110 may have the same or different types of guest operating systems, such as Microsoft® Windows®, Linux®, Solaris®, etc. Virtual machine 110 may execute guest operating system 112 that manages guest memory 116.

Guest memory 116 may be any virtual memory, logical memory, physical memory, other portion of memory, or a combination thereof for storing, organizing, or accessing data. Guest memory 116 may represent the portion of memory that is designated by hypervisor 120 for use by virtual machine 110. Guest memory 116 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. In one example, the guest pages may be memory blocks of a volatile or non-volatile memory device and may each correspond to an individual memory block, multiple memory blocks, or a portion of a memory block.

Host memory 124 (e.g., hypervisor memory) may be the same or similar to the guest memory but may be managed by hypervisor 120 instead of a guest operating system. Host memory 124 may include host pages, which may be in different states. The states may correspond to unallocated memory, memory allocated to guests, and memory allocated to hypervisor. The unallocated memory may be host memory pages that have not yet been allocated by host memory 124 or were previously allocated by hypervisor 120 and have since been deallocated (e.g., freed) by hypervisor 120. The memory allocated to guests may be a portion of host memory 124 that has been allocated by hypervisor 120 to virtual machine 110 and corresponds to guest memory 116. Other portions of hypervisor memory may be allocated for use by hypervisor 120, a host operating system, hardware device, other module, or a combination thereof.

Hypervisor 120 may also be known as a virtual machine monitor (VMM) and may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a configuration component 122 and host memory 124.

Configuration component 122 may execute configuration operations on on-device IOMMU 152 and system IOMMU 160. In particular, configuration component 122 may enable PCI device 150 to access guest memory 116 using host physical addresses, configure on-device IOMMU 152 to translate all memory access requests associated with the virtual machine 110 and store the translations in IOMMU page table 154, and to enable a translated-request bit for each memory access request that is translated by on-device IOMMU 152. Configuration component 122 may further enable the system IOMMU 160 to enter pass-through mode in response to receiving a memory access request with an enabled translated-request bit, and to process interrupt requests from the PCI device 150 via the host system IOMMU. Configuration component 122 is discussed in more detail in regards to FIG. 2.

Hardware devices 130 may provide hardware resources and functionality for performing computing tasks. Hardware devices 130 may include one or more physical storage devices 132, one or more physical processing devices 134, system IOMMU 160, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

System IOMMU 160 may manage address translations in response to receiving memory access requests, interrupt requests, or any other data requests and/or commands. System IOMMU 160 may include page table 162 and translation component 168. Page table 162 is a data structure used to store a mapping of addresses of the guest memory 116 to addresses of the host memory 124. Accordingly, address translation is handled using the page table(s). For example, page table 162 may translate guest physical addresses 166 of guest memory 116 pages to host physical addresses 164 of host memory 124. Page table 162 may include one or more page tables such as a protected page table or an unprotected page table. In an example, host page table 162 may be an extended page table (EPT) translating guest physical addresses to host physical addresses. In another example, the page table 162 may be the shadow page table translating the guest virtual addresses to host physical addresses. In another example, page table 162 may be the hypervisor page table, translating the guest physical addresses to hypervisor virtual addresses.

Translation component 168 may determine whether to translate, using page table 162, a memory access request and/or an interrupt request. In some embodiments, translation component 168 may determine to translate a memory access request and/or an interrupt request in response to failing to detect or detecting a disabled (set to a value of 0) address translation flag appended to the memory access request. Otherwise, in response to detecting an enabled (set to a value of 1) address translation flag appended to a memory access request or an interrupt request, translation component 168 may enable the memory access request to pass-through system IOMMU 160 (e.g., set system IOMMU 160 to pass-through mode) and access host memory 124. In other embodiments, translation component 168 may determine whether to translate a memory access request and/or an interrupt request in response to detecting a specific address range associated with the memory access request. For example, in response to detecting a specific address range associated with the memory access request, translation component 168 may enable the request to pass-through system IOMMU 160.

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

PCI device 150 may be a computer hardware device that plugs directly into a PCI slot of the computer system 100. PCI device 150 may be assigned to the guest operation system 112 of the virtual machine 110 and may communicate with the guest operation system 112. PCI device 150 may include DMA (direct memory access) capabilities, which allow PCI device 150 to access system memory (e.g., physical storage devices 132) for reading and/or writing independently of a system CPU (e.g., physical processing devices 134). For example, the PCI device 150 may transfer its input/output (I/O) data directly to and from physical storage devices 132. The PCI device 150 may include on-device IOMMU 152 to manage address translations, and memory management component 162.

On-device IOMMU 152 may map, to a page table, the device address space (e.g., a bus address) that is relevant to the I/O bus into the physical address space (e.g., host physical address) that is relevant to the memory bus. On-device IOMMU 152 may include extra information associated with the address space mapping, such as read and write permissions for the memory page. On-device IOMMU 152 may include an IOMMU page table 154. IOMMU page table 154 may translate guest physical addresses 158 of guest memory 116 pages to host physical addresses 156 of host memory 124. For example, on-device IOMMU 152 may retrieve or receive mapping data from hypervisor 120 and/or system IOMMU 160 via a memory access request, a polling operation, etc. On-device IOMMU 152 may then cache the mapping data and generate records in IOMMU page table 154, where each record maps a guest physical address 158 and a host physical address 156.

Memory management component 162 may issue memory access requests for guest memory 116 and interrupt requests to virtual machine 110, hypervisor 120, and/or system IOMMU 160. In some embodiments, memory management component 162 may translate a memory access request using, for example, IOMMU page table 154. Further, memory management component 162 may append an address translation flag to a translated memory access request, and set the address translation flag to a value of 1. Thus, the translated memory access request may pass-through system IOMMU 160 and access host memory 124. The features of memory management component 162 is discussed in more detail in regards to FIG. 2.

Figure 2:
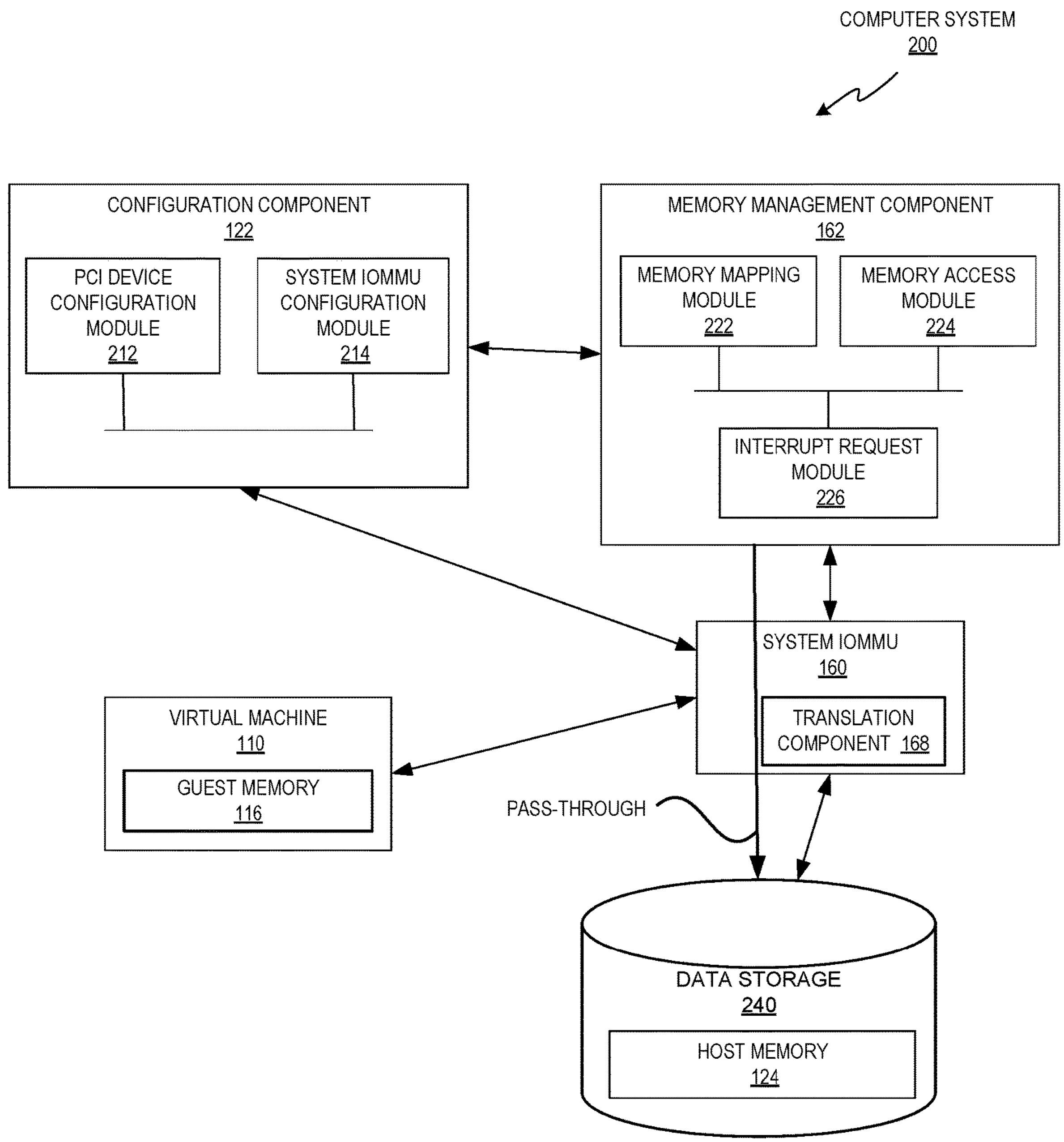
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. More or less components or modules may be included without loss of generality. For example, two or more of the modules may be combined into a single module, or features of a module may be divided into two or more modules. In the example shown, computer system 200 may include configuration component 112, system memory management component 162, virtual machine 110, system IOMMU 160, and data storage 240.

Configuration component 112 may provide instructions to the PCI device 150 and to the system IOMMU 160 to enable memory request handling by PCI device 150 and system IOMMU 160. As illustrated, configuration component 122 may include PCI device configuration module 212 and system IOMMU configuration module 214. PCI device configuration module 212 may send instructions to PCI device 150 to enable PCI device 150 to perform memory translations using memory management component 162. System IOMMU configuration module 214 may send instructions to translation component 168 to determine whether a received memory request (e.g., memory access request, interrupt request, etc.) includes a translated-request bit, and in response to detecting the translated-request bit set to a value of 1, enter pass-through mode. PCI device configuration module 212 and system IOMMU configuration module 214 may enable the PCI device 150 and translation component 168, respectively, using a software packet(s), a firmware packet(s), a device driver, virtual hardware, or any combination thereof.

Memory management component 162 may include memory mapping module 222, memory access module 224, and interrupt request module 226. In some embodiments, IOMMU configuration module 214 may configure translation component 168 of system IOMMU 160. PCI device 150 may access virtual device memory (e.g., guest memory 116) using host physical addresses. For example, memory mapping module 222 may request address translations (guest physical memory to host physical memory) from the system IOMMU 160. Memory mapping module 222 may receive the address translations from system IOMMU 160 and store the address translations in IOMMU page table 154. Specifically, memory mapping module 222 may append a set of page table entries to IOMMU page table 154, where each page table entry translates a guest physical address of guest memory 116 to a host physical address of the host memory 124.

Memory management component 162 may use the on-device IOMMU 152 to translate memory access requests associated with virtual machine 110 (instead of using IOMMU 160 for memory access request translations). For example, in response to memory management component 162 receiving or initiating a memory access request for one or more memory page from guest memory 116, memory access module 224 may translate the memory access request using the address translations stored in IOMMU page table 154. Thus, memory management component 162 may attempt to access the requested memory page directly from the host memory 124. By accessing the requested memory page directly from the host memory 124, the memory access module 224 does not need to translate the memory access request using system IOMMU 160, thus avoiding potentially causing a performance bottleneck.

To indicate to system IOMMU 160 whether the memory access request issued by memory access module 224 needs to be translated, memory management component 162 may use a translated-request bit. In particular, memory access module 224 may append an address translation flag to each memory access request issued by memory management component 162. For memory access requests that are translated using IOMMU page table 154, memory access module 224 may enable the address translation flag by setting the address translation flag to a value of 1. For memory access requests that are not translated using IOMMU page table 154 (thus, need to be translated using system IOMMU 160), memory access module 224 may disable the address translation flag by setting the translated-request bit to a value of 0. Thus, the translated memory access request may pass-through system IOMMU 160 and access host memory 124. On the other hand, if a memory access request is unable to be translated by on-device IOMMU 152 (e.g., due to missing translation records in IOMMU page table 154), the memory access request may be translated by system IOMMU 160 and then access host memory 124. Accordingly, memory mapping module may then cache the translation data associated with the memory access request and update IOMMU page table 154.

System IOMMU 160 may enter pass-through mode in response to detecting an enabled address translation flag appended to a memory access request. In an example, in response to receiving a memory access request from PCI device 150, translation component 168 may determine whether the memory access request is appended with the address translation flag. Responsive to detecting the address translation flag and determining that the address translation flag is set to a value of 1, translation component 168 may enable the memory access request to access the host memory without trapping the memory access request for translation by the system IOMMU 160. Responsive to failing to detect the address translation flag or detecting the address translation flag and determining that the address translation flag is set to a value of 0, translation component 168 may trap the memory access request in a queue for translation by the system IOMMU 160.

Memory management component 162 may communicate, via interrupt request module 226, interrupt requests to the system IOMMU 160. In some embodiments, interrupt requests do not include an address translation flag. In other embodiments, interrupt requests may be appended with the address translation flag, and the address translation flag may be set to a value of 0. In response to receiving an interrupt request from PCI device 150, translation component 168 may determine whether the memory access request is appended with an address translation flag. Responsive to failing to detect the address translation flag or detecting the address translation flag and determining that the address translation flag is set to a value of 0, translation component 168 may trap the memory access request in a queue for translation by the system IOMMU 160. Once translated, translation component 168 may send the translated interrupt request to the virtual central processing unit (vCPU) of virtual machine 110.

In some embodiments, translation component 168 may determine whether to translate a memory access request and/or an interrupt request in response to detecting a specific address range associated with the request. For example, in response to detecting a specific address range associated with the request, translation component 168 may enable the request to pass-through system IOMMU 160 and access the host memory.

By way of illustrative example, a hypervisor may manage a virtual machine in communication with a PCI device. One or more memory pages related to a task running on the virtual machine may be loaded into the guest memory of the virtual machine. The PCI device may receive a packet, from the network, to store in the guest memory. The packet may include a guest physical address. The PCI device may translate the guest physical address associated with the packet to a host physical address, append an enabled address translation flag to the translated memory access request (to write the data associated with the packet onto the onto host memory), and send the translated memory access request to the host system IOMMU. The host system IOMMU may determine that the memory access request includes the address translation flag set to a value of 1, and allow the memory access request to write data to the address space associated with the host physical address without trapping the memory access request for translation by the host system IOMMU. To notify the virtual machine about the packet, the PCI device may send an interrupt request (e.g., a message signal interrupt) to the guest physical address without enabling the address translation flag appended to the interrupt request. The system IOMMU may intercept the interrupt request and determine that the interrupt request includes a disabled address translation flag. The system IOMMU may then translate the interrupt request to determine which virtual machine is associated with the interrupt request, and send the interrupt request to the corresponding virtual machine.

Figure 3:
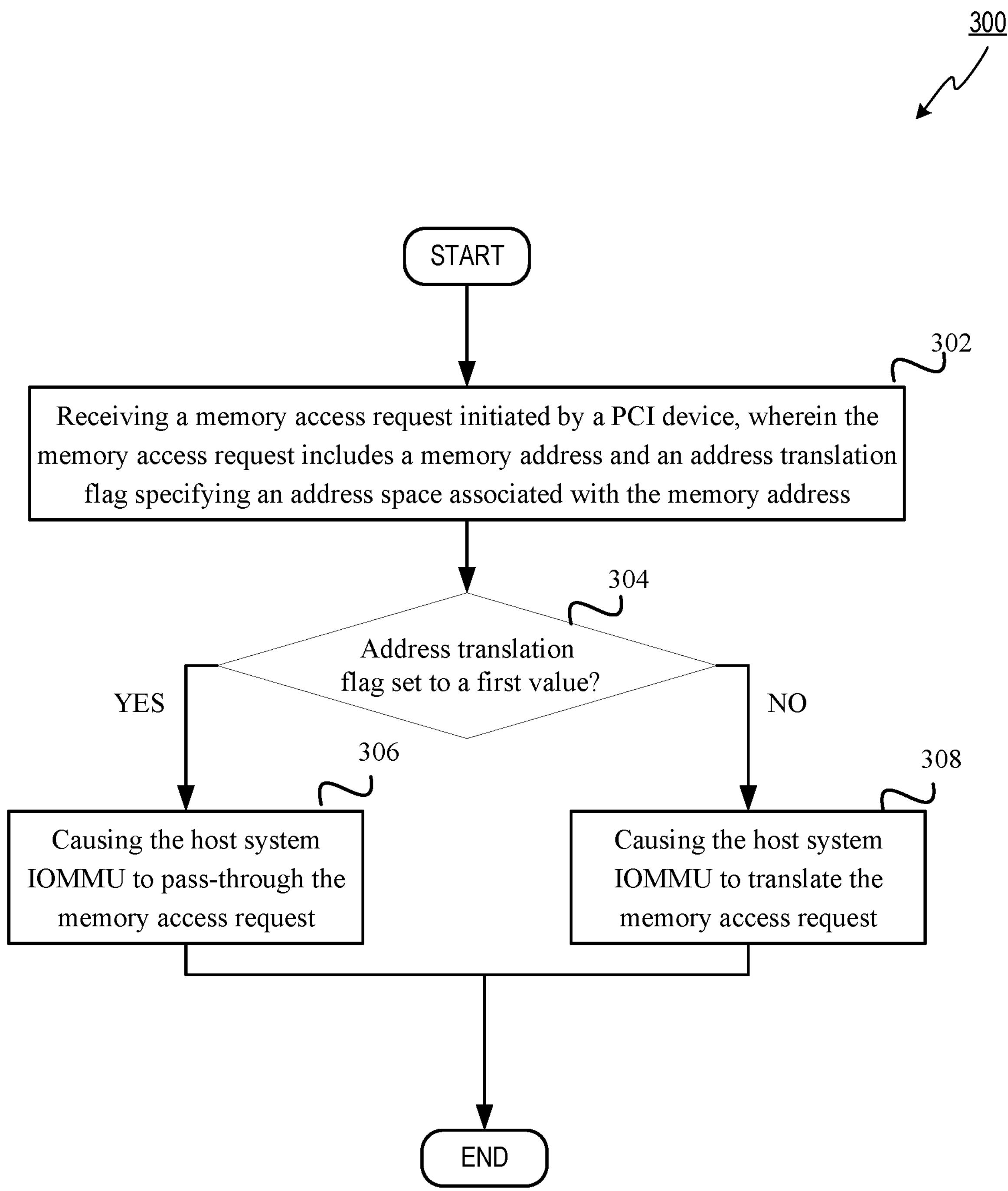
FIG. 3 depicts a flow diagram of an example method for PCI device memory management, in accordance with one or more aspects of the present disclosure.

FIG. 3 depicts a flow diagram of an illustrative example of a method 300 for PCI device memory management, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 302. A host computing system may run a hypervisor managing a virtual machine in communication with a PCI device. The PCI device may include an IOMMU. At block 302, the host computing system may receive a memory access request initiated by a peripheral component interconnect (PCI) device. The memory access request may include a memory address and an address translation flag specifying an address space associated with the memory address.

At block 304, the host system may determine whether the address translation flag is set of a first value (e.g., a value of 1) indicating a host address space.

At block 306, responsive to determining that the address translation flag is set to the first value indicating a host address space, the host computing system may cause the host system input/output memory management unit (IOMMU) to pass-through the memory access request. In an example, the PCI device may translate memory access requests using an on-device IOMMU. The PCI device may further append an address translation flag set to the first value to each memory access request translated by the on-device IOMMU.

At block 308, responsive to determining that the address translation flag is set to a second value (e.g., a value of 0) indicating a device address space, the host computing system may cause the host IOMMU to translate the memory address specified by the memory address request. The device address space may include a guest address space, an address space used by a virtual machine, and address space used by the PCI device, etc. Once translated, the host computing system may send the translated interrupt request to a virtual central processing unit (vCPU) of a virtual machine.

In some embodiments, the host computing system may receive another memory access request initiated by the PCI device. The memory access request may include a memory address. Responsive to determining that the memory address is within a specific address range, the system IOMMU may pass-through the memory access request. Responsive to completing the operations described herein above with references to block 308, the method may terminate.

Figure 4:
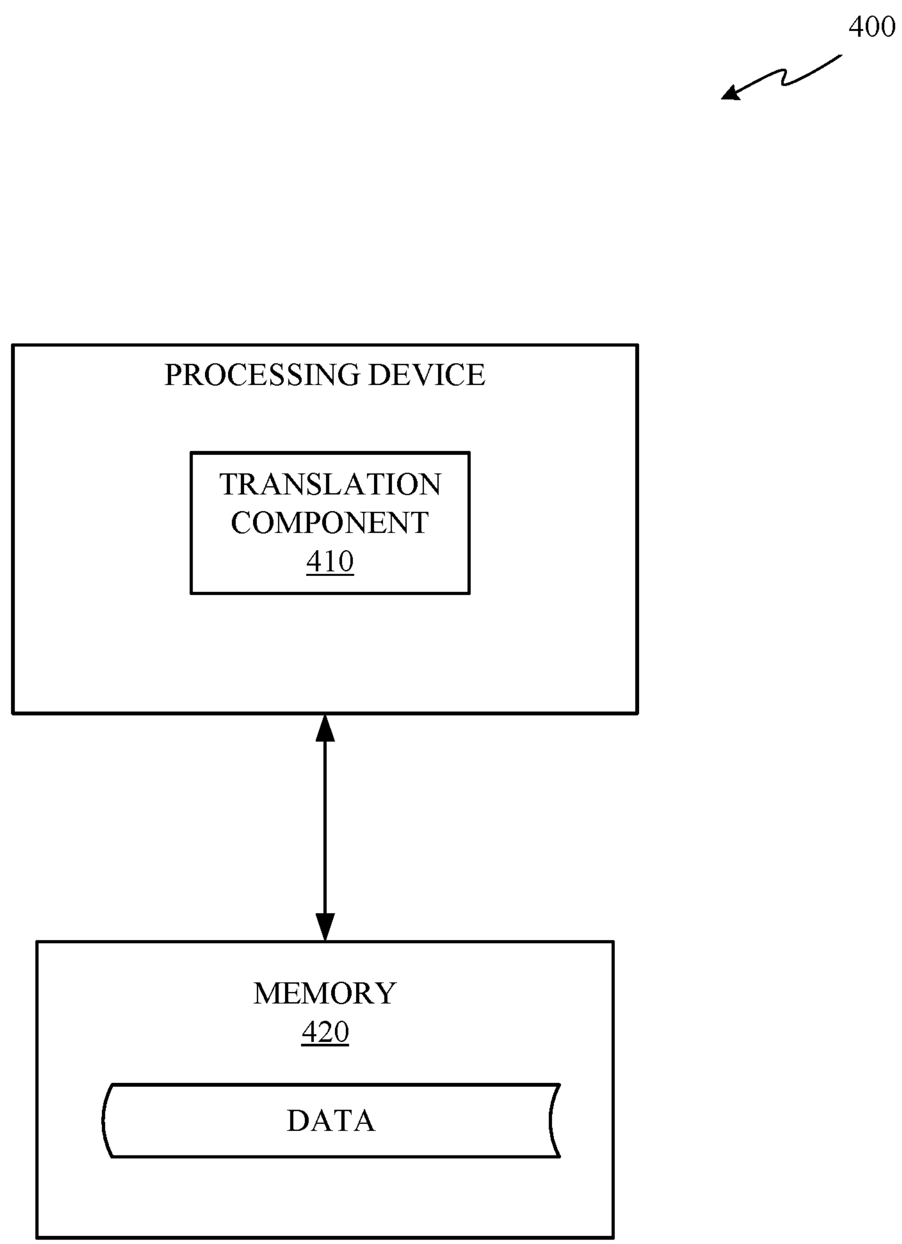
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computer system 100 and may include one or more processing devices and one or more memory devices. In the example shown, computer system 500 may include a translation component 410 and memory 420.

Translation component 410 may receive a memory access request initiated by a peripheral component interconnect (PCI) device. The memory access request may include a memory address and an address translation flag specifying an address space associated with the memory address. Translation component 410 may then determine whether the address translation flag is set of a first value (e.g., a value of 1) indicating a host address space. Responsive to determining that the address translation flag is set to the first value indicating a host address space, translation component 410 may cause the host system input/output memory management unit (IOMMU) to pass-through the memory access request. In an example, the PCI device may translate memory access requests using an on-device IOMMU. The PCI device may further append an address translation flag set to the first value to each memory access request translated by the on-device IOMMU. In some embodiments, translation component 410 may receive another memory access request initiated by the PCI device. The memory access request may include a memory address. Responsive to determining that the memory address is within a specific address range, translation component 410 may pass-through the memory access request.

Figure 5:
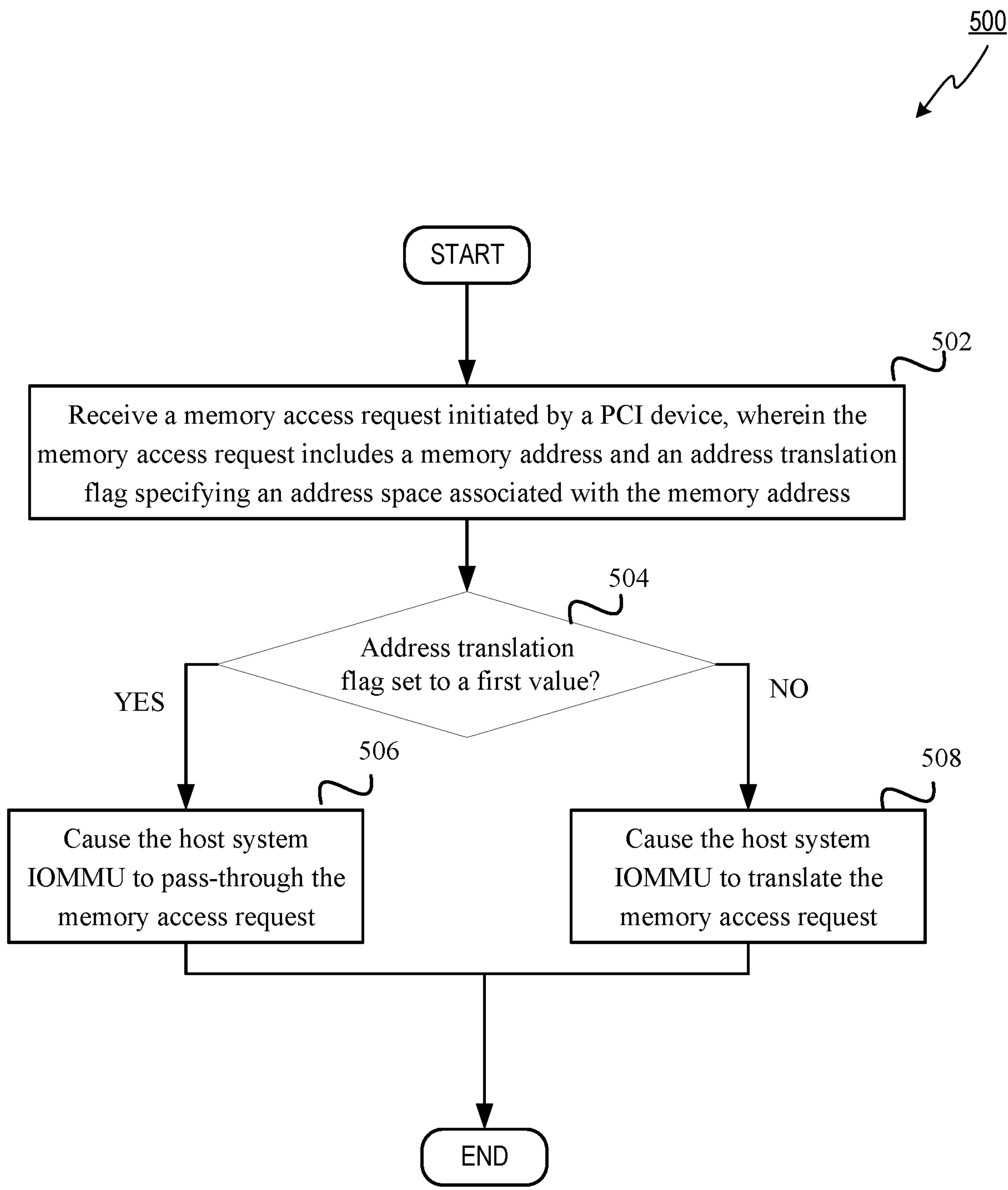
FIG. 5 depicts a flow diagram of another example method for PCI device memory management, in accordance with one or more aspects of the present disclosure.

FIG. 5 depicts a flow diagram of one illustrative example of a method 500 for PCI device memory management, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may receive a memory access request initiated by a peripheral component interconnect (PCI) device. The memory access request may include a memory address and an address translation flag specifying an address space associated with the memory address.

At block 504, the processing device may determine whether the address translation flag is set of a first value (e.g., a value of 1) indicating a host address space.

At block 506, responsive to determining that the address translation flag is set to the first value indicating a host address space, the processing device may cause the host system input/output memory management unit (IOMMU) to pass-through the memory access request. In an example, the PCI device may translate memory access requests using an on-device IOMMU. The PCI device may further append an address translation flag set to the first value to each memory access request translated by the on-device IOMMU.

At block 508, responsive to determining that the address translation flag is set to a second value (e.g., a value of 0) indicating a device address space, the processing device may translate the memory address specified by the memory address request. The device address space may include a guest address space, an address space used by a virtual machine, and address space used by the PCI device, etc. Once translated, the host computing system may send the translated interrupt request to a virtual central processing unit (vCPU) of a virtual machine.

In some embodiments, the processing device may receive another memory access request initiated by the PCI device. The memory access request may include a memory address. Responsive to determining that the memory address is within a specific address range, the processing device may pass-through the memory access request. Responsive to completing the operations described herein above with references to block 508, the method may terminate.

Figure 6:
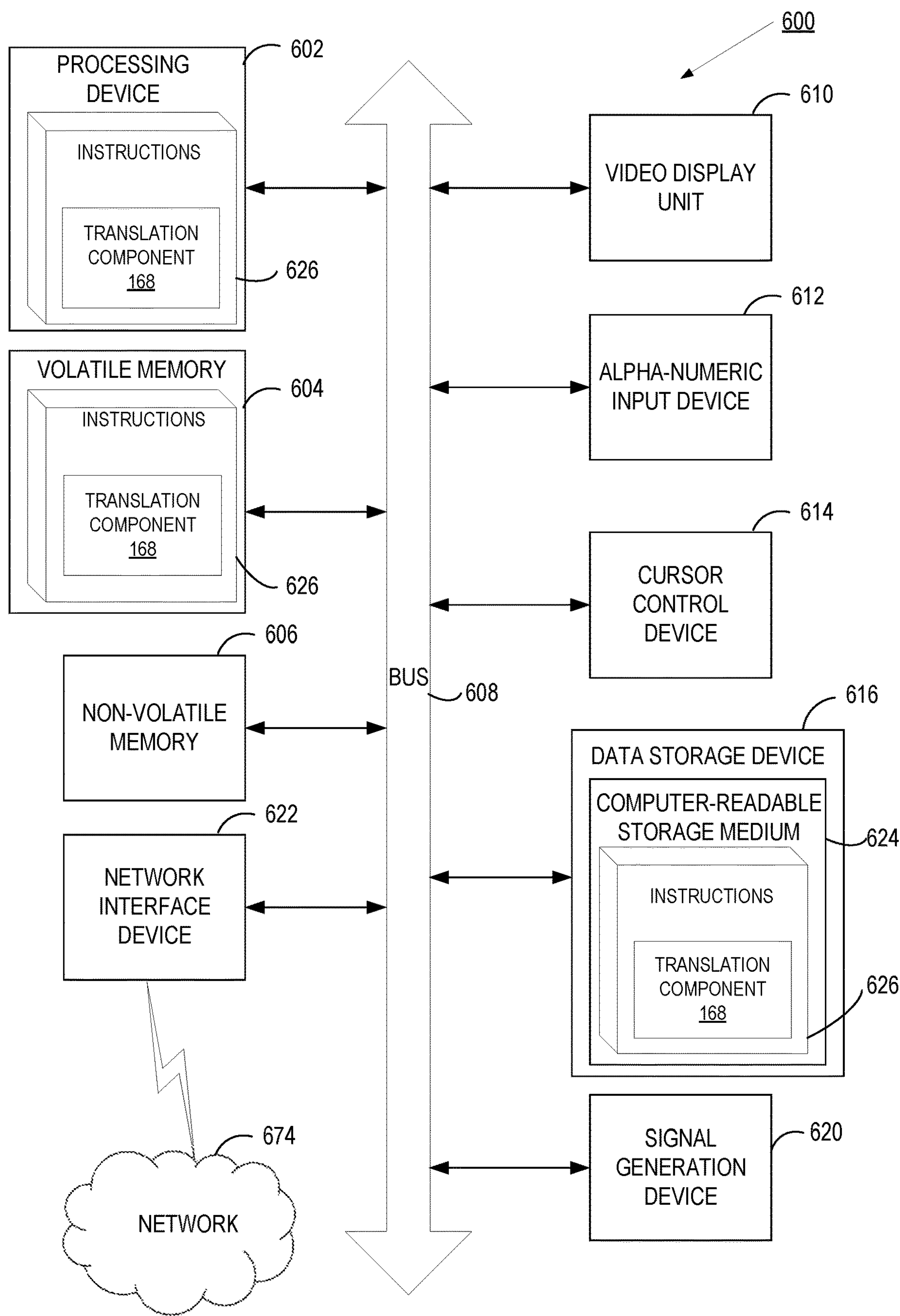
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 1000 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for translation component 168, execution component 122 (not shown), and modules illustrated in FIGS. 1 and 2.

Instructions 626 may also reside, completely or partially, within volatile memory 1004 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

receiving, by a host computing system, a memory access request initiated by a peripheral component interconnect (PCI) device, wherein the memory access request comprises a memory address and a first address translation flag indicative of whether the memory access request is a translated memory access request or an untranslated memory access request;

responsive to determining that the first address translation flag is set to a first value indicating that the memory access request is a translated memory access request, causing a host system input/output memory management unit (IOMMU) to pass-through the memory access request to host memory;

receiving an interrupt request initiated by the PCI device, wherein the interrupt request comprises the memory address and a second address translation flag;

responsive to determining that the second address translation flag is set to a second value, causing the host system IOMMU to translate the memory address specified by the interrupt request; and sending the translated interrupt request to a virtual central processing unit (vCPU) of a virtual machine.

2. The method of claim 1, further comprising configuring, by the host computing system, the PCI device to translate memory access requests using an on-device IOMMU.

3. The method of claim 1, further comprising:

configuring, by the host computing system, the PCI device to append an address translation flag set to the first value to each memory access request translated by a on-device IOMMU.

4. The method of claim 1, further comprising:

receiving, by the host computing system, a further memory access request initiated by the PCI device, wherein the memory access request comprises a memory address; and responsive to determining that the memory address is within a specific address range, causing the host system IOMMU to pass-through the memory access request.

5. A system, comprising:

a memory;

a processing device operatively coupled to the memory, the processing device configured to:

receive a memory access request initiated by a peripheral component interconnect (PCI) device, wherein the memory access request comprises a memory address and a first address translation flag indicative of whether the memory access request is a translated memory access request or an untranslated memory access request;

responsive to determining that the first address translation flag is set to a first value indicating that the memory access request is a translated memory access request, causing a host system input/output memory management unit (IOMMU) to pass-through the memory access request to host memory;

receive an interrupt request initiated by the PCI device, wherein the interrupt request comprises the memory address and a second address translation flag;

responsive to determining that the second address translation flag is set to a second value, cause the host system IOMMU to translate the memory address specified by the interrupt request; and send the translated interrupt request to a virtual central processing unit (vCPU) of a virtual machine.

6. The system of claim 5, wherein the processing device is further configured to:

configure the PCI device to translate memory access requests using an on-device IOMMU.

7. The system of claim 5, wherein the processing device is further configured to:

configure the PCI device to append an address translation flag set to the first value to each memory access request translated by a on-device IOMMU.

8. The system of claim 5, wherein the processing device is further configured to:

receive a further memory access request initiated by the PCI device, wherein the memory access request comprises a memory address; and responsive to determining that the memory address is within a specific address range, cause the host system IOMMU to pass-through the memory access request.

9. A non-transitory machine-readable storage medium storing executable instructions that, when executed by a processing device, cause the processing device to:

receive a memory access request initiated by a peripheral component interconnect (PCI) device, wherein the memory access request comprises a memory address and a first address translation flag indicative of whether the memory access request is a translated memory access request or an untranslated memory access request;

responsive to determining that the first address translation flag is set to a first value indicating that the memory access request is a translated memory access request, causing a host system input/output memory management unit (IOMMU) to pass-through the memory access request to host memory;

receive an interrupt request initiated by the PCI device, wherein the interrupt request comprises the memory address and a second address translation flag;

responsive to determining that the second address translation flag is set to a second value, cause the host system IOMMU to translate the memory address specified by the interrupt request; and send the translated interrupt request to a virtual central processing unit (vCPU) of a virtual machine.

10. The non-transitory machine-readable storage medium of claim 9, further comprising executable instructions that, when executed by the processing device, cause the processing device to:

configure the PCI device to translate memory access requests using an on-device IOMMU; and configure the PCI device to append an address translation flag set to the first value to each memory access request translated by the on-device IOMMU.

11. The non-transitory machine-readable storage medium of claim 9, wherein the processing device is further configured to:

receive a further memory access request initiated by the PCI device, wherein the memory access request comprises a memory address; and responsive to determining that the memory address is within a specific address range, cause the host system IOMMU to pass-through the memory access request.

* * * * *